United States Patent [19]

Mickelson

[11] 4,167,080

[45] Sep. 11, 1979

[54] PLANTER HAVING SELF-INDEXING DRAIN DISH

[76] Inventor: Richard C. Mickelson, 1911 Riverside Dr., Glendale, Calif. 91201

[21] Appl. No.: 850,689

[22] Filed: Nov. 11, 1977

[51] Int. Cl.$^2$ ............................................. A01G 9/02
[52] U.S. Cl. ...................................................... 47/71
[58] Field of Search ................... 47/66, 67, 70, 71, 72, 47/79, 80, 81; 206/423

[56] References Cited

U.S. PATENT DOCUMENTS

| | | | |
|---|---|---|---|
| 196,937 | 11/1877 | Russell | 47/71 |
| 1,572,548 | 2/1926 | Mattison | 47/67 |
| 3,949,524 | 4/1976 | Mickelson | 47/79 |
| 4,059,920 | 11/1977 | Worrell | 47/71 |

FOREIGN PATENT DOCUMENTS 2345905 3/1975 Fed. Rep. of Germany .............. 47/71

*Primary Examiner*—Edgar S. Burr
*Assistant Examiner*—James R. Feyrer
*Attorney, Agent, or Firm*—Roger A. Marrs

[57] ABSTRACT

A plant carrier is disclosed herein for holding a plant and its soil which includes an open-ended enclosure having a bottom integrally formed at its peripheral edge with an upwardly projecting continuous sidewall diverging outwardly from the bottom. The bottom further includes a downwardly depending cup-like portion having a plurality of holes or openings formed in the annular sidewall thereof for drainage purposes. A central opening is provided in the cup-like portion which is releasably matable with a projection centrally located on a dish member so that a snap-lock releasable engagement is produced. The releasable snap-lock members cooperate not only for releasably holding the dish member to the cup-like portion but serves as a self-locating system for aligning the dish member with the cup-like portion.

1 Claim, 5 Drawing Figures

PLANTER HAVING SELF-INDEXING DRAIN DISH

BACKGROUND OF THE INVENTION

1. Field of the Invention

The present invention relates to the field of planters and plant carriers for holding a natural growing plant including its life supporting environment and, more particularly, to a novel plant carrier of this type having a moisture collection tray which is self-locating and releasably detachable to the underside of the carrier.

2. Brief Description of the Prior Art

In the past, it has been the conventional practice to construct hanging or standing flower planters from wood or metal materials and shaped in such a fashion as to hold the plant and surrounding moist soil. Difficulties have been encountered with these conventional planters which stem largely from the fact that the moisture in the soil progresses to the bottom of the planter and does not evenly distribute throughout the soil or soil mixture. Some attempts have been made to avoid this problem by providing holes in the bottom of the planter and by incorporating an integrally formed tray for collecting the water once it has passed through the soil. Since cleaning of the tray is extremely difficult when it is attached to the carrier, some prior art devices include a detachable cup-like member which collects the water and which may be readily removed for cleaning purposes followed by reattachment to the underside of the planter or plant carrier. Such a device is shown in U.S. Pat. No. 3,949,524.

Although the detachable cup-like portion is detachably connected, as shown in the prior art device and which is successful for its intended purpose, the device includes four projections which require indexing and mating with four holes before attachment can take place. In most instances, persons attempting the attachment will index the cup-like portion with the tray by aligning a projection on the tray with a hole in the cup-like portion. Next, the user must twist or revolve the tray in either a counterclockwise or a clockwise direction until the projections mate with the holes in the sidewall of the cup-like portion before securement will take place.

Alignment problems have been experienced by users whereby the projections do not readily align with their respective or associated holes and such causes an inconvenience to the user.

Therefore, a long standing need has been present to provide a plant carrier having a removable tray which may be readily located or indexed to the underside of the planter with greater convenience than can otherwise be gained using such devices as disclosed in U.S. Pat. No. 3,949,524.

SUMMARY OF THE INVENTION

Accordingly, the above problems and difficulties are obviated by the present invention which provides an enclosure for holding a plant in its soil that includes an open-ended enclosure having a bottom integrally formed at its peripheral edge with an upward projecting continuous sidewall which diverges outwardly from the bottom. The bottom is provided with a downwardly depending cup-like portion having a plurality of openings formed in the annular sidewall thereof for drainage purposes. A removable tray or dish member is formed with a centrally located projection adapted to be mated with a central opening in the cup-like portion for alignment and attachment purposes. Means are provided on the projection which cooperate with the edges of the hole so that a snap-lock relationship is produced for removably or releasably connecting the tray to the cup-like portion.

Therefore, it is among the primary objects of the present invention to provide a novel plant carrier which includes a removable or detachable water collection tray releasably secured to the underside of an enclosure or carrier portion.

Another object of the present invention is to provide a novel plant carrier having a cup-like portion downwardly depending from the underside thereof which includes snap-lock means for releasably coupling a water collection tray thereto and wherein the snap-lock means provides automatic self-aligning of the collection tray with respect to the cup-like portion.

Still another object of the present invention is to provide a novel plant carrier for a plant and its life environment system which includes a removable tray and self-alignment means as well as snap-locking means for connecting the tray to the underside of the carrier.

Still a further object of the present invention is to provide an improved water collection means taking the form of a detachable tray releasably secured to the underside of the carrier wherein the releasable means includes self-locating and self-locking means for providing the releasable interconnection.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which:

DESCRIPTION OF THE PREFERRED EMBODIMENT

Figure 1:
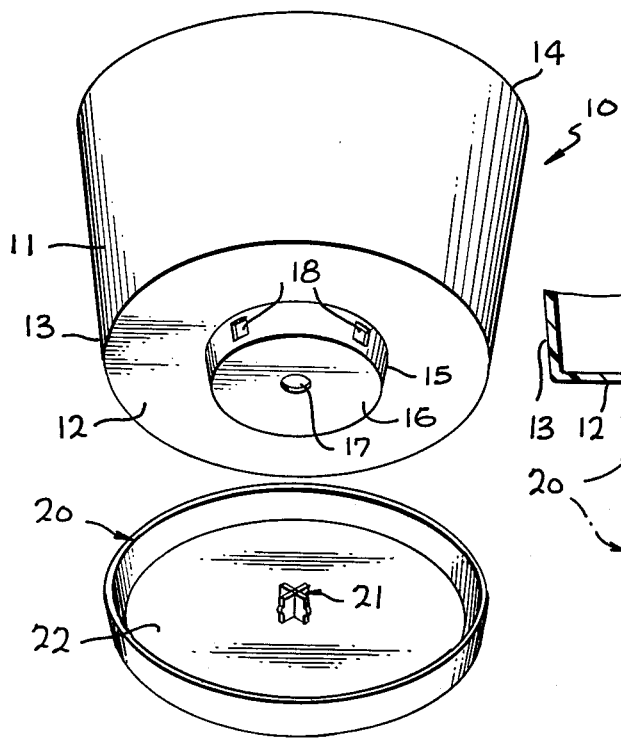
FIG. 1 is an exploded perspective view of the novel planter of the present invention and illustrating the removable dish or tray separated from the underside of the carrier.

FIG. 1 illustrates the novel planter or plant carrier of the present invention and is illustrated in the general direction of arrow 10. The plant carrier comprises an enclosure indicated by the numeral 11 which may be supported from a ceiling hook or eyelet or may be supported on the surface of a bench, table or other platform.

Figure 2:
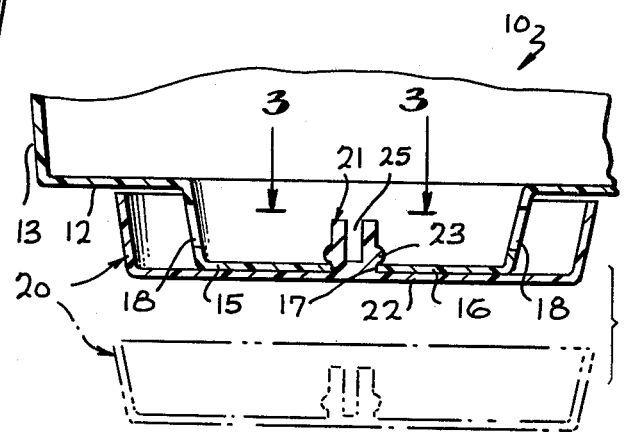
FIG. 2 is an enlarged transverse cross-sectional view of the planter and tray illustrated in attached form in solid lines and detached in broken lines.

As shown more clearly in FIGS. 1 and 2, the enclosure 11 includes a bottom 12 having a peripheral edge which is integrally formed to provide a continuous sidewall indicated by numeral 13. It is noted that the sidewall is tapered in a diverging manner from the bottom 12 upwardly where the sidewall terminates in an edge or lip 14. The edge 14 functions as an integral entrance or opening leading into the interior of the enclosure intended to be occupied by soil and the plant.

The bottom 12 includes a downwardly depending cup-like portion or member 15 which is integrally formed with the bottom and provides an internal cavity into which the plant life supporting environment such as soil is disposed. The cup-like member 15 includes a bottom panel 16 which is formed with a central opening or hole 17. A plurality of holes are also provided about the wall of the member 15 and such a hole is typically illustrated by the numeral 18. The holes or apertures 18 are provided in fixed spaced-apart relationship about the periphery of the member 15 and are intended to conduct the passage of water for drainage purposes from the soil exteriorly of the enclosure 11.

The inventive feature of the present invention provides that the hole or opening 17 be a part of a snap-locking arrangement or mechanism whereby a drainage tray member 20 may be releasably or detachably connected therewith. The other portion of the snap-lock mechanism resides in an upwardly projecting member 21 which is carried on a bottom 22 of the tray 20. The hole or aperture 17 receives the projection 21 so that slightly outwardly extending lobes 23 integrally formed on each element of four elements comprising the projection snap over the bottom 16 in releasable securement. Numeral 24 indicates one of the four elements comprising the total projection 21. FIG. 2 clearly illustrates the element and the fact that its associated lobe 23 is arranged in spaced relationship with respect to the bottom 22 so that the thickness of the bottom 16 will provide a snug or tight fit therebetween. Aligning of the projection 21 with the opening or hole 17 serves to locate the tray 20 with respect to the cup-like member 15 so that alignment is achieved and applying pressure on the underside of the tray member 20 forcibly urges the peripheral edge of the bottom 16 defining the hole 17 over the lobes 23 carried on the respective elements of the projection 21 to effect the snap-lock relationship. It is to be particularly noted that the tray member 20 need not be rotated in order to align projections and holes such as is required in the aforementioned patent. Alignment or locating as well as snap-lock relationship is achieved by the sole insertion of projection 21 with the opening 17 and the forcible entry of the projection therein. Thereby, a user avoids the unnecessary rotation or twisting of the plant carrier or tray member with respect to each other as is required in the aforementioned patent.

Figure 3:
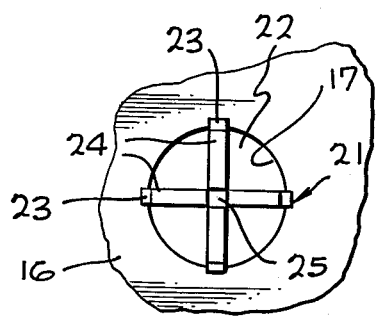
FIG. 3 is an enlarged plan view of the releasable and self-locating means shown in the direction of arrows 3—3 of FIG. 2.

It is to be particularly noted that the projection 21 consists of four elements 24 which are arranged at approximately ninety degrees with respect to one another and that this relationship is shown more clearly in FIG. 3. It can also be seen that the lobes, such as represented by numeral 23 associated with element 24, projects outwardly over the edge of the hole defining the opening 17. The projections are somewhat resilient in their ability to move back and fourth since the center or central area of the projection 21 is open and the area is generally indicated by the numeral 25.

Figure 4:
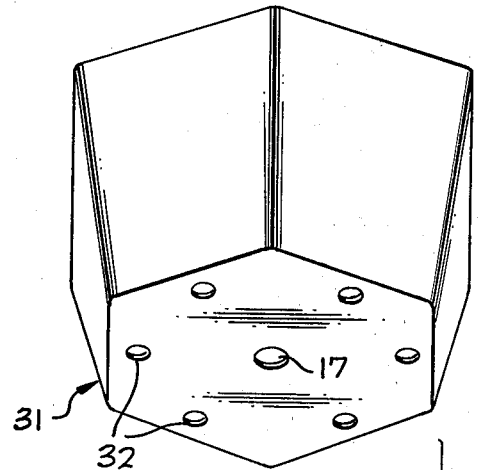
FIG. 4 is an exploded perspective view of another embodiment of the present invention.
Figure 5:
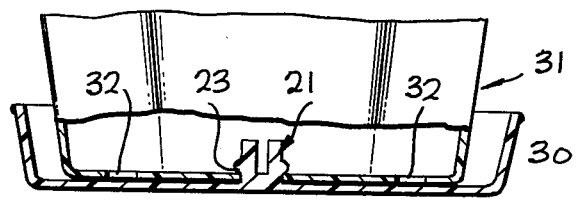
FIG. 5 is a view similar to the view of FIG. 2 showing the releasable connection means and self-locating means of the present invention.

In FIGS. 4 and 5, another embodiment of the invention is shown wherein the tray member is indicated by numeral 30 and the tray includes a hexagon configuration which mates or corresponds to the sidewall configuration of an enclosure 31. Therefore, indexing is achieved not only by the alignment of the projection 21 with the opening 17 in the bottom of the enclosure but by aligning corresponding sidewalls of the tray member 30 with the enclosure 31 so that the configuration will mate as the tray member is pressed upwardly towards the bottom of the enclosure. Furthermore, the latter embodiment further includes a plurality of drainage holes, such as represented by numeral 32 which permits water to seep into the tray member 30.

FIG. 5 shows the spring lock or snap-lock relationship wherein projection 21 including the four elements is forcibly inserted through the opening 17 so that the respective lobes 23 snap over the bottom edge of the enclosure defining the hole 17.

In view of the foregoing, it can be seen that the novel plant carrier or planter of the present invention provides an enclosure for a plant and its life support medium which includes a removable water tray 21 that snap-locks in attachment with the bottom of the carrier enclosure. The snap-lock relationship is positive and the tray may be readily removed for cleaning purposes. In prior art devices, attachment of the tray member to the bottom of the enclosure requires rotation of the tray member with respect to either the bottom of the cup-like member carried by the enclosure until a plurality of projections are aligned with associated holes. In the present invention, it is only necessary that the centrally located projection 21 and hole 17 be aligned and that the snap-lock relationship then takes place. Therefore, the tray member and planter enclosure of the present invention provides a simpler, less expensive and a far more convenient device for the user. Also, the sidewall openings or apertures 18 carried on the cup-like member 15 are not occupied by the snap-lock means as shown in the prior patent. The openings are fully exposed so that passage of moisture and air is unrestricted.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. A plant carrier for holding a growing plant and its life supporting soil comprising:

an enclosure having a bottom and an integral sidewall projecting upwardly and outwardly from the peripheral edge of said bottom wherein said bottom and sidewall define a cavity occupied by the growing plant and its life supporting soil;

said bottom having an integrally formed, downwardly depending cup-like portion including an annular sidewall and a flat bottom of smaller dimension than said enclosure bottom;

a dish-like tray removably carried on said flat bottom of said cup-like portion having a pre-determined dimension intermediate said dimensions of said enclosure bottom and said cup-like portion bottom so that a uniform upwardly tapering sidewall of said enclosure is maintained;

a plurality of openings provided in said cup-like portion sidewall in fixed spatial relationship from said cup-like portion bottom into said dish-like tray for collection;

combined snap-lock and locator means releasably coupling said tray to said cup-like portion which includes a centrally located hole coaxially disposed on the central vertical axis of said enclosure and an upright vertical projection carried on said cup-like portion bottom for insertion into said centrally located hole whereby said tray is centered and snap-locked together;

said projection includes a plurality of rounded lobes outwardly extending from opposite sides thereof so as to define a space between the underside of each of said lobes and the surface of said tray bottom so as to receive the bottom thickness of said cup-like portion;

said cup-like portion bottom and said dish-like tray bottom having opposing surfaces in abutting contact engagement with each other so that an annular water gathering channel is defined between the opposing surfaces of said dish-like tray sidewall and said cup-like portion sidewall;

said projection consists of at least four elements composed of resilient material so as to provide a yieldable restriction to the edge of said cup-like portion bottom hole;

said projections elements are arranged so as to be fixed at one end to said dish-like tray bottom and cantilevered upwardly at their opposite ends in spatial relationship; and said tray and said enclosure are of corresponding and identical geometric configuration.

* * * * *